United States Patent [19]

Klink et al.

[11] Patent Number: 4,614,260
[45] Date of Patent: Sep. 30, 1986

[54] CENTRIFUGAL CLUTCH

[75] Inventors: Rainer Klink, Kernen; Johann German, Weinstadt, both of Fed. Rep. of Germany

[73] Assignee: Deutsche Automobilgesellschaft, mbH, Fed. Rep. of Germany

[21] Appl. No.: 664,550

[22] Filed: Oct. 25, 1984

[30] Foreign Application Priority Data

Oct. 26, 1983 [DE] Fed. Rep. of Germany ....... 3338776

[51] Int. Cl.$^4$ ............................................. F16D 43/00
[52] U.S. Cl. .............................................. 192/105 CE
[58] Field of Search ........ 192/103 B, 105 A, 105 BA, 192/105 CE; 188/184, 140 A

[56] References Cited

U.S. PATENT DOCUMENTS 2,400,585  5/1946  Wolff .
4,226,309 10/1980  Siliberschlag ............ 192/105 CE X
4,305,493 12/1981  Siliberschlag ............ 192/105 CE X

FOREIGN PATENT DOCUMENTS 2743595  4/1979  Fed. Rep. of Germany .
894201  1/1958  United Kingdom .
1572616  3/1977  United Kingdom .

Primary Examiner—George H. Krizmanich
Attorney, Agent, or Firm—Barnes & Thornburg

[57] ABSTRACT

A centrifugal coupling with fly elements pressable against the internal surface of a friction drum contact to spring biasing forces wherein the fly elements each include at least two concentric partial weights mutually connected by radially-acting compression springs. The radial stroke of the inner partial weight or weights is limited by a primary side stop, so that from a specific predetermined speed any further increase in the centrifugal force from the inner partial weight directly acting upon the outer partial weight is prevented. The partial weights are further provided with check ramps, inclined in the circumferential direction, for a driver pin mounted on the primary side in order to give the torque curve of the coupling an optimum configuration. In some embodiments the check ramp on the outer partial weight may be replaced by a lever mounted on the primary side which transforms the force generated by the inner partial weight into a centripetal force acting upon the outer partial weight.

20 Claims, 15 Drawing Figures

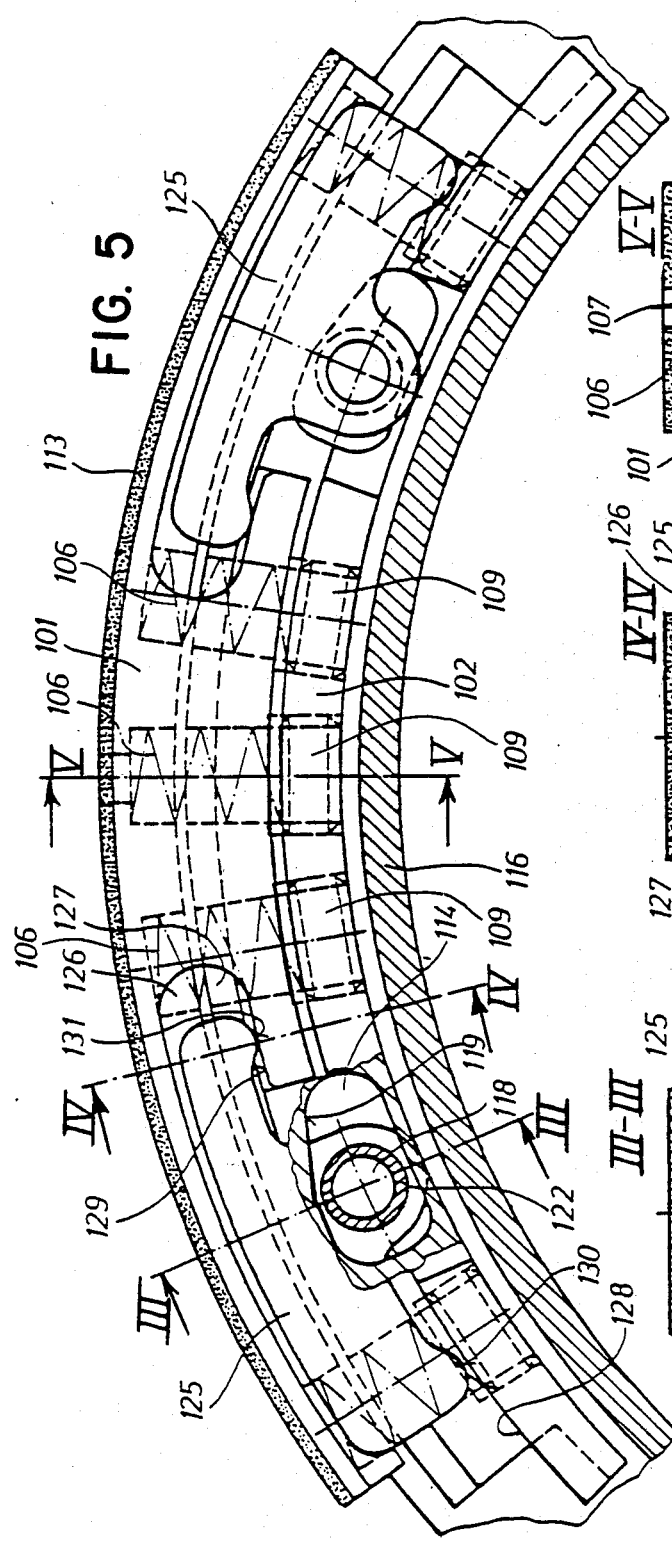

CENTRIFUGAL CLUTCH

BACKGROUND AND SUMMARY OF THE INVENTION

The invention relates generally to centrifugal couplings and, more particularly, to such couplings arranged as starting couplings to precede an automatic motor vehicle transmission, or installed as bridging couplings in a hydrodynamic torque converter.

It is possible in such couplings for vehicles, during a kick-dwn operation and the associated speed jumps, for example, for jolts to occur which may interfere considerably with riding comfort and possibly even damage components. These jolts or torque surges are attributable to the fact that, at high rotary speeds, the torque transmission capacity of the centrifugal coupling is a multiple of the engine torque and it is therefore impossible for a moderating speed slip to occur. If such a coupling were dimensioned so that it can just transmit the engine torque at high speeds, then at low speeds and high torques it would always operate in the slip range, which would result in considerable wear.

It is already known, from German Offenlegungsschrift (published unexamined patent application) No. 2,913,694, to divide the fly weight element of centrifugal couplings into two partial weights mutually connected by a spring, and to associate a primary side stop with the inner partial weight. Then, with increasing rotary speed, the inner partial weight contacts the stop so that with further increasing rotary speed only the outer partial weigh is effective as a source additional contact pressure. This results in a flattening of the centrifugal coupling torque curve (as shown in FIG. 7a) from the speed at which the inner partial weight contacts the stop (point A in FIG. 7a). However, torque surges during starting and shifting operations are nevertheless left out of consideration and not compensated for.

An object of the present invention is to provide a centrifugal coupling in which the torque curve can be influenced by starting and shifting operations as well as changes in the rotary speed, and which is particularly capable of reducing torque surges.

This and other objects of the present invention are attained in the provision of a centrifugal coupling with fly elements pressable against the internal surface of a friction drum counter to spring biasing forces wherein the fly elements each include at least two concentric partial weights mutually connected by radially-acting compression springs. The radial stroke of the inner partial weight or weights is limited by a primary side stop, so that from a specific primary speed any further increase in the centrifugal force from the inner partial weight directly acting upon the outer partial weight is prevented. The partial weights are further provided with check ramps, inclined in the circumferential direction, for a driver pin mounted on the primary side in order to give the torque curve of the coupling an optimum configuration. In some embodiments the check ramp on the outer partial weight may be replaced by a lever mounted on the primary side which transforms the force generated by the inner partial weight into a centripetal force acting upon the outer partial weight.

Other objects, features, and advantages of the present invention will become more apparent from the following description when taken with the accompanying drawings(s) which show, for purposes of illustration only, an embodiment/several embodiments in accordance with the present invention.

BRIEF DESCRIPTION OF THE DRAWINGS

FIG. 5 shows a partially sectioned view of a fly element according to another embodiment of the present invention.

FIG. 6a shows a cross-sectional view of the fly element of FIG. 5 through the plane of section III—III of FIG. 5.

FIG. 6b shows a cross-sectional view of the fly element of FIG. 5 through the plane of section IV—IV of FIG. 5.

FIG. 6c shows a cross-sectional view of the fly element of FIG. 5 through the plane of section V—V of FIG. 5.

DETAILED DESCRIPTION OF THE DRAWINGS

Figure 1:
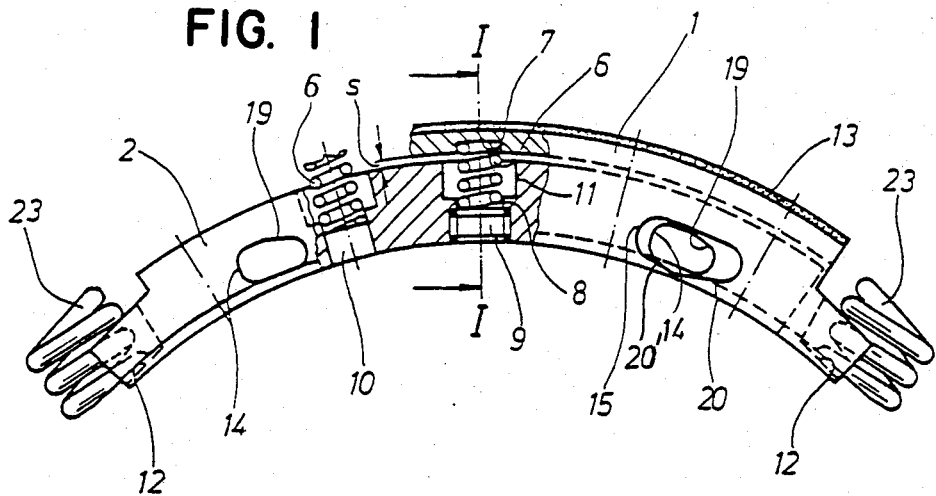
FIG. 1 shows a fly element comprising two partial weights according to the present invention, of which the inner partial weight is illustrated partially sectioned (left) and the outer partial weiight is illustrated partially sectioned and fragmented (right).
Figure 2:
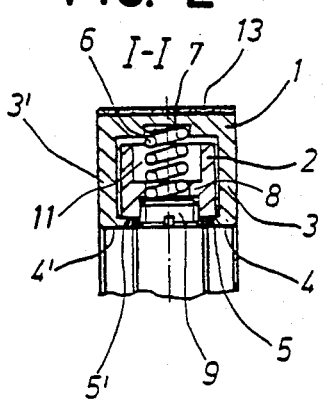
FIG. 2 shows a cross-sectional view of the fly element of FIG. 1 through the plane of section I—I of FIG. 1.

As may be seen from FIGS. 1-4, the fly weight element means consists of two fly element parts or partial weights 1 and 2 which are separated in the axial direction and exhibit a movement play S in the radial direction. Outer partial weight 1 has a U-shaped cross-section with extending arm members 3 and 3'. Internal annular collars 4 and 4' are formed on arm members 3 and 3', respectively. The outer cylindrical surface of partial weight 1 carries friction lining 13. Inner partial weight 2 is formed so as to have an approximately T-shaped cross-section with external annular collars 5 and 5' which can be braced against collars 4 and 4', respectively, of partial weight 1. The outer partial weight thus encloses the inner partial weight in U-shape, considered in axial section. This arrangement is particularly preferred because it is economical of space, and in this case, due to the annular collars, there is a possibility of providing the connecting resilient means, such as compression springs, with a desired adjustable tension, as described later.

Inner partial weight 2 can be moved in the radial direction and in the circumferential direction relative to outer partial weight 1. This mobility is restricted in that radially arranged spring elements (compression springs) 6 establish a tensioning force between the fly element parts and bias them apart. Spring elements 6 are mounted in depressions 7 on outer partial weight 1 and in bores 8 of inner partial weight 2. The tensioning force of spring elements 6, can for example, be adjusted by set screws 9. However, it is also sufficient, after the assembly of the spring elements between the inner and outer partial weights, to close bores 8 and tension the spring elements radially by means of pressed-in cylindrical pieces 10, for example.

Bores 8 are enlarged to a greater diameter 11 in the upper region of inner partial weight 2. As a result of this, by exerting a circumferential force proportional to the lateral resiliency of spring elements 6, the inner partial weight can be displaced within certain limits in the circumferential direction relative to outer partial weight 1.

As FIG. 1 further shows, either or both outer partial weight 1 (illustrated on the right) or inner partial weight 2 (illustrated on the left) is formed with a pan-like depression 12 at its ends. These depressions serve for fixing return springs 23 of the fly element. The return springs function to determine the engagement speed of the centrifugal coupling.

Orifices 14 and 15 are also machined into the partial weights in corresponding positions. They serve to accommodate the drive elements for the fly element and also for the circumferential force between the driving part and the driven part of the centrifugal coupling which results from the torque to be transmitted.

Figure 3:
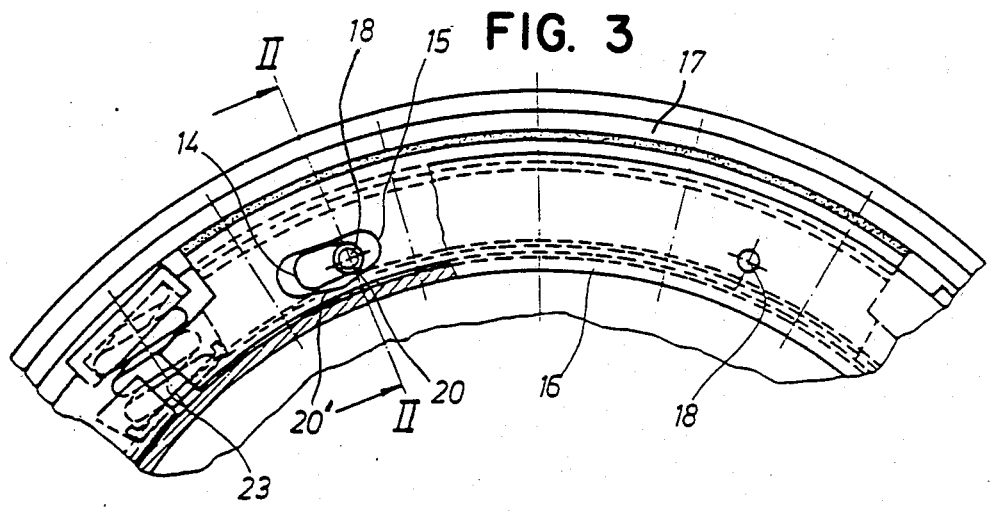
FIG. 3 shows a partial view of a radial section through a centrifugal coupling in the operating condition according to the present invention.

FIG. 3 shows the fly element according to FIG. 1 as it is installed in driver ring 16 of a centrifugal coupling. A plurality of such fly elements can be present in a single couplin assembly according to the present invention. The principle of operation is that return springs 23, braced outwardly in driver ring 16, press the fly element radially inwards. Only at rotary speeds for which the centrifugal force of the fly element is greater than the spring force of the return springs does the fly element move radially outwards to overcome movement play S and come into abutment against friction drum 17. If the rotary speed is increased further, both the transmissible centrifugal force of inner partial weight 2 and that of outer partial weight 1, and therefore, via friction lining 13 and the corresponding friction drum radius, the transmissible torque of the centrifugal coupling, increase.

If the rotary speed is increased until the tensioning force of compression springs 6 is exceeded by the centrifugal force of inner partial weight 2, then inner partial weight 2 moves radially towards outer partial weight 1. The force on the springs produced due to this movement is transmitted directly to outer partial weight 1 and is added to the centrifugal force of the outer partial weight. According to the rotary speed, this movement of inner partial weight 2 can occur until the inner part of orifice 14 abuts the primary side radial stop, which, in this case for example, is bolt-shaped driver 18 mounted firmly in driver ring 16.

Figure 7A:
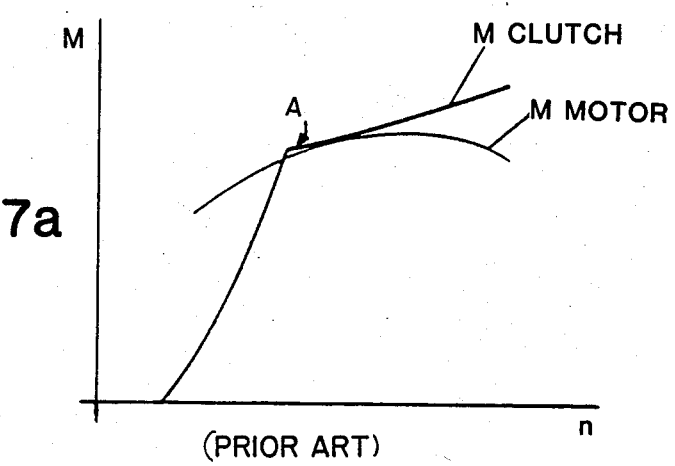
FIG. 7a shows diagramaticly a coupling torque curve in comparison with an engine torque curve according to the prior art.

From this moment onwards, despite increases in rotary speed, no further additional centrifugal force of inner partial weight 2 can be transmitted to outer partial weight 1. The force acting from inner partial weight 2 upon outer partial weight 1 now remains constant, and only the transmissible centrifugal force of outer partial weight 1 continues to increase with increasing rotary speed to increase the transmissible torque of the centrifugal coupling. This relationship of the coupling torque with respect to the motor torque is illustrated diagramaticly in FIG. 7a. It has been found that the flattening of the coupling torque curve in this case is the greater, the smaller the mass of the outer partial weight relative to that of the inner partial weight.

During this process, due to the circumferential force, the entire fly element can move towards driver 18 in the circumferential direction, namely until a lateral side of orifice 14 comes to abut the driver. The torque can therefore then be transmitted from driver ring 16 through driver 18, the fly element and friction lining 13 to friction drum 17. During that phase of operation before the driver is contacted by a lateral side of orifice 14, torque transmission occurs via the lateral deflection of the return springs 23 mounted in the driver ring, and therefore a soft engagement is ensured.

Figure 9:
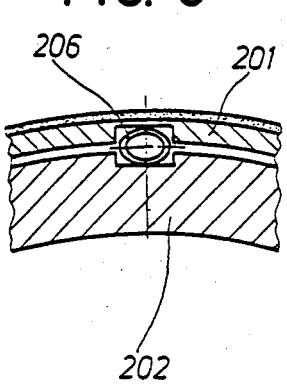
FIG. 9 shows cross-sectionally another embodiment of the present invention wherein a tubular spring is employed between the inner and outer partial weights of a fly element as compression spring.

The resilient means for establishing tensioning force between the inner and outer partial weights is not restricted in the present invention to the use of cylindrical helicoidal springs, for example, as shown in FIG. 1. Cup spring arrangements or rubber springs (elastomers) or other known means may also be employed. In another embodiment of the present invention, shown in cross-sectional detail in FIG. 9, one or more appropriately dimensioned, thin-walled tubular pieces or tubular sections 206 are employed as tubular springs between inner partial weight 202 and outer partial weight 201.

Up to this point in the description of the present invention, the principles of operation of the present centrifugal coupling resemble that of the coupling known from German Offenlegungsschrift No. 2,913,694. However, unlike that prior reference, the present invention further provides self-intensifying and/or self-attenuating devices arranged in the form of inclined check ramps on at least one partial weight. For this purpose, one or more recesses are arranged on the relevant partial weight, which each enclose a primary side driver in the circumferential direction and are provided with check ramps inclined in the direction of rotation. It has been found to be particularly advantageous in some embodiments of the present invention for the primary side radial stop to also assume the function of the driver.

Figure 4:
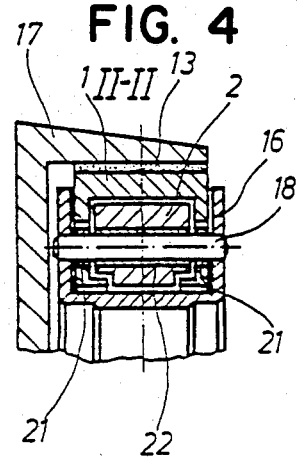
FIG. 4 shows a cross-sectional view of the centrifugal coupling of FIG. 3 through the plane of section II—II of FIG. 3 (rotated through 21.5°).
Figure 7B:
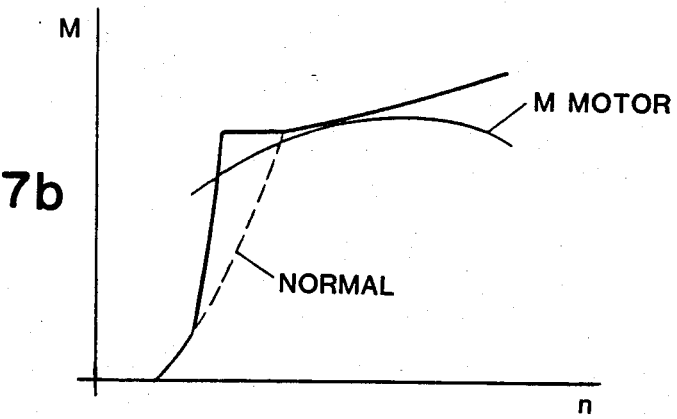
FIG. 7b shows diagramaticly a coupling torque curve in comparison with an engine torque curve with the intensifying check ramp (positive) on the inner partial weight, according to the principles of the present invention.

In FIGS. 1 and 4, these check ramps are shown, for example, machined into orifices 14 and 15 of partial weights 2 and 1, respectively, as bevels. If orifice 14 of inner partial weight 2 is provided with a ramp or bevel 19 at the top side thereof, and if that partial weight is displaced counter-clockwise due to the circumferential force, then, as a result of the wedge effect caused by the engagement of driver 18 with bevel 19, an intensification occurs of the radial components of the torque which is transmitted, via the compression springs present between the partial weights, to outer partial weight 1 and thus causes a stiffer torque characteristic. This relationship of coupling torque with respect to motor torque is illustrated diagramaticly in FIG. 7b. The servo effect of bevel 19 and driver 18 is limited if, as explained earlier, the lateral side of orifice 14 comes into abutment against the driver 18 such that the driver now acts as a stop to further motion of the inner partial weight.

Figure 7C:
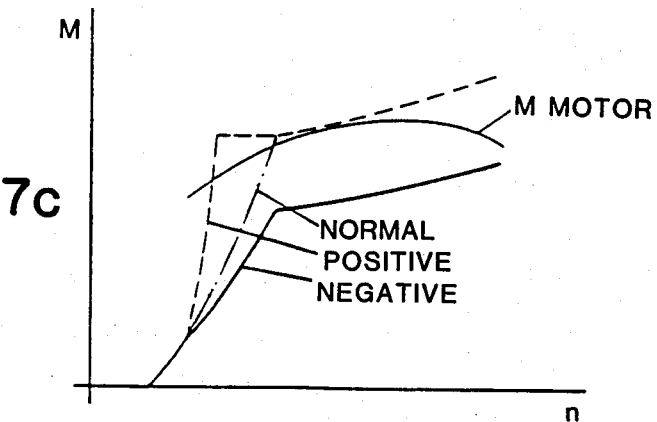
FIG. 7c shows diagramaticly a coupling torque curve in comparison with an engine torque curve with the attenuating check ramp (negative) on the outer partial weight, further according to the principles of the present invention.

The present invention also provides attenuation of the transmission capacity of the coupling by having a bevel 20 on the lower side of orifice 15 of the outer partial weight. Bevel 20 comes into engagement with driver 18 when both the circumferential force and also the circumferential movement are greater than required for abutment of driver 18 and bevel 19 of the inner partial weight. This is the case when compression springs 6 permit relative circumferential movement between the fly element parts. For this reason, in preferred embodiments of the present invention the lower line of engagement of bevel 20 is placed closer to the pivot point of the centrifugal coupling than the lower line of engagement of orifice 14. In this manner, a torque surge can be dissipated, for example, because the coupling commences to slip briefly due to the attenuation. This relationship of coupling torque with respect to motor torque is illustrated diagramaticly in FIG. 7c.

Bolts employed as drivers 18 are, for example, provided with movable sleeves 21 and 22 in order to reduce friction, as shown in FIG. 4. Further, where such a centrifugal coupling is used for only one direction of rotation, then it is sufficient to provide ramps on bevels extending to only one lateral side of the orifices. However, where it is used with both directions of rotation, then it has been found to be advantageous to provide bevels to both lateral sides of the orifices in conformity with the action of the circumferential forces. For example, as shown in FIGS. 1 and 3, orifice 15 is provided with bevel 20 extending to the right lateral side and bevel 20' extending to the left lateral side.

In the case of a centrifugal coupling according to the present invention installed in a motor vehicle torque converter, it has been found to be advantageous, for example, to associate both the positive or intensifying bevel and the negative or attenuating bevel with the directions corresponding to operation in traction. On the other hand, association of the attenuating bevel alone is sufficient for operation of such a torque converter in thrust. Further, due to the division of the fly element into two partial weights, these bevels can be distributed between the two partial weights in a particularly advantageous and functionally favorable manner. For example, an intensifying bevel can be associated with the inner partial weight in order to increase the starting torque, and two attenuating bevels associated with the outer partial weight in order to absorb higher torque surges by brief slipping of the coupling.

Although the present invention has been described and illustrated above only with respect to a two piece fly element, it is specifically comtemplated that the fly element may be formed from a plurality of concentric partial weights if the installation space so permits and the operating characteristics so demand. Also, other means may be employed as a stop for the inner fly element parts. For example, the spring housing for the return spring or grooves turned on the circumference of the partial weights which correspond to projections in the driver ring can be formed so as to function as such a stop.

Due to the extremely differently shaped torque curves, defined by $M = f(n)$ where n is the rotational speed of the motor, of prime movers, and particularly those of internal-combustion engines, in certain cases it may not be advisable to adapt a given centrifugal coupling to some of the above-described features of the present invention. In such cases the advantages of the present invention are achieved by additional features. In particular, the inner partial weight, after overcoming the radial movement play, influences in the centrifugal direction one or more levers mounted on the primary side of the driver ring. One arm of one or each of these levers forms the primary side stop. The force at the other end of the levers influences, in the centripetal direction, the outer partial weight, which is abutted by the other arm or arms, so that a rising, constant or falling torque transmission characteristic can be generated depending upon the mass proportions of the fly element parts and in conformity with the lever transmission ratio after the abutment of the levers and further increase of the rotary speed.

Here again the transmission capacity of this embodiment of the present invention in the lower speed range can further be increased and better surge moderation achieved if the inner partial weight is provided with at least one intensifying check ramp or bevel. Such an arrangement is illustrated in FIGS. 5 and 6. Inner partial weight 102 has a T-shaped cross-section and is inserted into outer partial weight 101 in the circumferential direction. Inner partial weight 102 is tensioned to the outer partial weight by resilient means, such as spring elements 106. These spring elements are supported by pressure pieces 109 (set screws, for example) in inner partial weight 102 and in bores 107 of outer partial weight 101.

The fly element is set into a U-shaped driver ring 116. Levers 125 are mounted on bolts forming driver 118 which are pressed into the sides of driver ring 116. Before the fly element is inserted into the driver ring, the levers are inserted laterally into corresponding recesses 126 and 127 of the fly element parts, and the sleeves 122 are pushed in between the levers. The levers are shaped so that lever ends 130, located farther out in the circumferential direction, are braced against annular collar 128 and 128' of inner partial weight 102. Lever ends 131, also located farther in the circumferential direction, are braced against annular collar 129 and 129' of outer partial weight 101. In the rest condition of the centrifugal coupling, a definite movement play is provided between the annular collars and the lever end. The levers can, in some embodiments of the present invention, be fit to rotate through 180° in the plane of the drawing if the annular collars are appropriately shaped.

The entire fly element is braced in both the radial direction and in the circumferential direction at the outer ends by return springs (not shown), as in the above-described embodiments illustrated in FIGS. 1 and 4.

When the centrifugal coupling of the present invention shown in FIG. 5 is set in rotation, the entire fly element moves radially outwards when the centrifugal force exceeds the force of the return springs. Torque transmission occurs when lining outer contour 113 touches the cylinder drum (not shown). From this moment on outer partial weight 101 cannot execute any further radial movement. When the rotary speed is increased further, inner partial weight 102 continues to move farther radially outwards and transmits its centrifugal force through inner tensioning means 106 to outer partial weight 101. Due to the circumferential force produced by friction lining 113, circumferential movement is typically executed simultaneously. This movement is braced by the return springs. In the example illustrated in FIG. 5, for a clockwise rotation of the driver ring, the fly element moves counter-clockwise relative to the latter.

When the torque exceeds that which can be transmitted by the return springs, bevel 119 comes into contact with sleeves 122 of driver 118 and causes an increased radial movement of the inner partial weight, and therefore, a greater radial force by tensioning means 106.

Radial movement occurs until annular collars 128 and 128' of inner partial weight 102 lever abuts the lever ends 130 and other lever ends 131 are braced against annular collars 129 and 129' of outer partial weight 101. Any further centrifugally directed radial movement or radial force from inner partial weight 102 therefore causes a centripetally directed force action through the levers upon outer partial weight 101.

In this manner a rising, constant or even falling torque characteristic ($M = f(n)$) can be generated depending upon the choice of the mass proportion of the inner to the outer fly element part, and of the lever ratio and mass proportions of lever ends 130 and 131, whereby extremely good adaptation to the characteristics of prime movers is achieved.

Figure 8A:
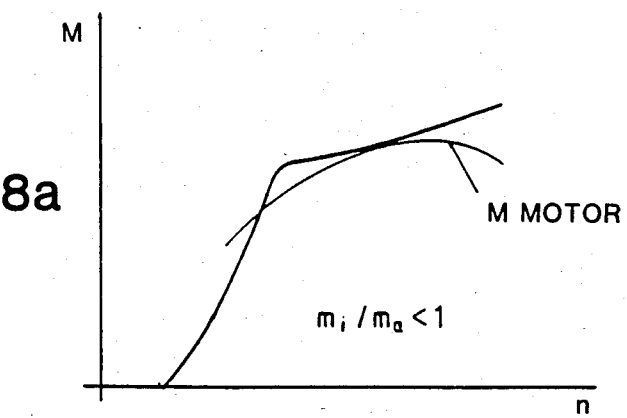
FIG. 8a shows diagramaticaly a torque curve of a centrifugal coupling with the lever system according to the embodiment of the present invention shown in FIG. 5 in comparison with a rising engine torque curve.
Figure 8B:
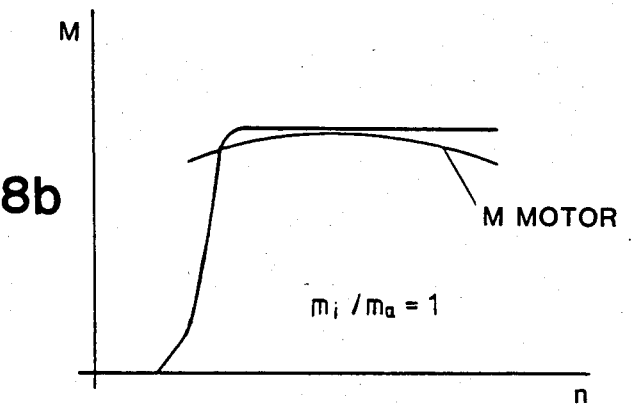
FIG. 8b shows diagramaticly a torque curve of a centrifugal coupling with the lever system according to the embodiment of the present invention shown in FIG. 5 in comparison with an approximately symmetrical engine torque curve.
Figure 8C:
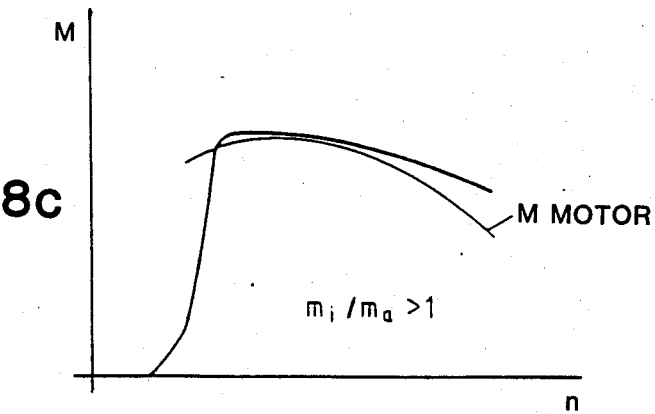
FIG. 8c shows diagramaticly a torque curve of a centrifugal coupling with the lever system according to the embodiment of the present invention shown in FIG. 5 in comparison with a falling engine torque curve.

FIGS. 8a–c show various torque curves ($M = f(n)$) for the same examplary fly element depending upon proportion of the mass of the inner fly element part, $m_i$, to that of the outer fly element part, $m_a$, specifically, coupling torque curves are illustrated for where $m_i/m_a = 1$, $m_i/m_a = 1$, and $m_i/m_a = 1$ in FIGS. 8a–c, respectively.

The advantageous torque surge moderation provided by the present invention is believed to be due to the fact that any additional positive torque variation which is greater than the maximum transmissible torque of the coupling associated with sudden or instantaneous speed is dissipated via the servo device (bevel) and the lever action.

As the embodiments of the present invention explained above show, it has been possible to fulfill the high desiderata for modern propulsion systems by utilising the principle of a fly element divided concentrically into a plurality of parts provided with check ramps or levers and mutually connected by resilient tensioning means.

In addition to the examples illustrated with bipartite fly elements, the present invention includes multiple divided fly elements, in which the individual fly element parts come into contact consecutively by different movement plays. Further, fly element parts can also be connected among themselves, by clamps or by collar bolts, etc., for example, in order to absorb the internal tensioning forces.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Centrifugal clutch apparatus comprising a fly element arrangement for drivingly connecting rotatably driven drive means and frictional surface means of a driver means which is engageable with friction surface means of fly element means in response to centrifugal forces induced by rotation of the driving means, said fly element arrangement including:
   an inner partial fly weight,
   an outer partial fly weight separate from the inner fly weight having a fly weight friction surface engageable with the friction surface means of a driven means,
   drive member means for drivingly interconnecting at least one of the inner and outer partial fly weights to a rotational driving means, and
   fly weight interconnecting means for operably interconnecting the inner and outer partial fly weights together so that centrifugal forces acting on both the inner and outer partial fly weights are transmitted to the fly weight friction surface,
   wherein said inner and outer fly weights each include separate guide path control means for controlling their circumferential and radial movement with respect to said drive member means whereby rotational speed dependent torque transfers between said drive member means and said frictional surface means of the driven means are controlled in a predetermined manner.

2. Apparatus according to claim 1, wherein said drive member means includes pin member means engageable with play in recess means of one of the inner and outer partial fly weights, and wherein said guide path control means includes inclined ramp sections of said recess means which forcibly engage the pin member means during driving of the drive member means with relative circumferential movement of the inner and outer partial fly weights.

3. Apparatus according to claim 1, wherein said drive member means includes pin member means engageable with play in respective recess means of both the inner and outer partial fly weights, and wherein said guide path control means includes inclined ramp sections of said recess means at both of said inner and outer partial fly weights, said inclined ramp sections being configured to forcibly engage the pin member means during driving of the drive member means with relative circumferential movement of the inner andouter partial fly weights.

4. Apparatus according to claim 3, wherein said ramp sections are inclined in a direction corresponding to intensification of the forces acting outwardly at the fly weight friction surface.

5. Apparatus according to claim 3, wherein said ramp sections of at least one of said fly weights are inclined in a direction corresponding to attenuation of the forces acting outwardly at the fly weight friction surface.

6. Apparatus according to claim 1, wherein said outer partial fly weight surrounds the inner partial fly weight with a U-shape.

7. Apparatus according to claim 3, wherein said pin member means extends parallel to the axis of rotation of said fly element arrangement, said pin member means including at least one pin member extending through recess means in both said inner and outer partial fly weights.

8. Apparatus according to claim 7, wherein said outer partial fly weight surrounds the inner partial fly weight with a U-shape.

9. Apparatus according to claim 7, wherein said inclined ramp section at the inner and outer fly weights are configured to effect different torque transfer characteristics in dependence on the direction of relative circumferential movement of said inner and outer fly weights.

10. Apparatus according to claim 1, wherein said guide path control means includes pivotal lever means forcibly interposed between said inner and outer partial weights.

11. Apparatus according to claim 10, wherein said pivotal lever means is pivotally supported at pin member means engageable with play in recess means of one of the inner and outer partial weights, and wherein said guide path control means includes inclined ramp sections of said recess means which forcibly engage the pin member means during driving of the drive member means with relative circumferential movement of the inner and outer partial fly weights.

12. Apparatus according to claim 1, further comprising spring support means continuously biasing said fly weights inwarely toward a rotational axis of the fly element arrangement.

13. Apparatus according to claim 12, further comprising connecting spring means interposed between said inner and outer partial fly weights, said connecting spring means being configured to permit relative circumferential movement of the inner and outer partial flyweights.

14. Apparatus according to claim 13, wherein said drive member means includes pin member means engageable with play in respective recess means of both the inner and outer partial fly weights, and wherein said guide path control means includes inclined ramp sections of said recess means at both of said inner and outer partial fly weights, said inclined ramp sections being configured to forcibly engage the pin member means during driving of the drive member means with relative circumferential movement of the inner and outer partial fly weights.

15. Apparatus according to claim 14, wherein said pin member means extends parallel to the axis of rotation of said fly element arrangement, said pin member means including at least one pin member extending through recess means in both said inner and outer partial fly weights.

16. Apparatus according to claim 15, wherein said outer partial fly weights surrounds the inner partial fly weight with a U-shape.

17. Apparatus according to claim 15, wherein said inclined ramp section at the inner and outer fly weights are configured to effect different torque transfer characteristics in dependance on the direction of relative circumferential movement of said inner and outer fly weights.

18. Apparatus according to claim 13, wherein said guide path control means includes pivotal lever means forcibly interposed between said inner and outer partial weights.

19. Apparatus according to claim 18, wherein said pivotal lever means is pivotally supported at pin member means engageable with play in recess means of one of the inner and outer partial weights, and wherein said guide path control means includes inclined ramp sections of said recess means which forcibly engage the pin member means during driving of the drive member means with relative circumferential movement of the inner and outer partial fly weights.

20. A radially-acting centrifugal coupling with fly elements pressable against an internal surface of a friction drum counter to spring force applying means, each of said fly elements having at least two concentric partial weights mutually connected by radially-acting compression springs which are separate from the spring force applying means, having a primary side stop means loaded by an inner of said concentric partial weights from a definite primary speed associated with said inner partial weight, wherein the primary side stop means for said inner partial weight is formed by an arm of a lever mounted on the primary side, an other arm of said lever coming into abutment against an outer of said concentric partial weights and attenuating the contact pressure there at the internal surface of the friction drive.

* * * * *